United States Patent
Uhrig

[15] 3,702,479
[45] Nov. 7, 1972

[54] SPACE DIVERSITY ANTENNA SYSTEM FOR UHF SATELLITE COMMUNICATIONS FOR HELICOPTERS

[72] Inventor: Jerome W. Uhrig, Dayton, Ohio

[73] Assignee: The United States of America as represented by the Secretary of the Air Force

[22] Filed: July 7, 1971

[21] Appl. No.: 161,360

[52] U.S. Cl. ..............343/705, 343/797, 343/821, 343/822, 343/853
[51] Int. Cl. ..............................................H01q 1/28
[58] Field of Search.......343/705, 797, 821, 822, 853

[56] References Cited

UNITED STATES PATENTS 2,422,107   6/1947   Luck ..................343/797

Primary Examiner—Eli Lieberman
Attorney—Harry A. Herbert, Jr. et al.

[57] ABSTRACT

Two pair of crossed tube radiators orthogonally fed and spaced approximately one wavelength apart with coaxial choke loading at the end of each radiator provides an antenna system for transmitting and receiving electromagnetic radiation through the plane of the rotating blades of a helicopter on two widely spaced frequencies in the UHF communication band.

3 Claims, 6 Drawing Figures

PATENTED NOV 7 1972 3,702,479

INVENTOR
JEROME W. UHRIG

Harry A. Herbert Jr
Robert Kern Duncan
BY
ATTORNEYS

INVENTOR
JEROME W. UHRIG

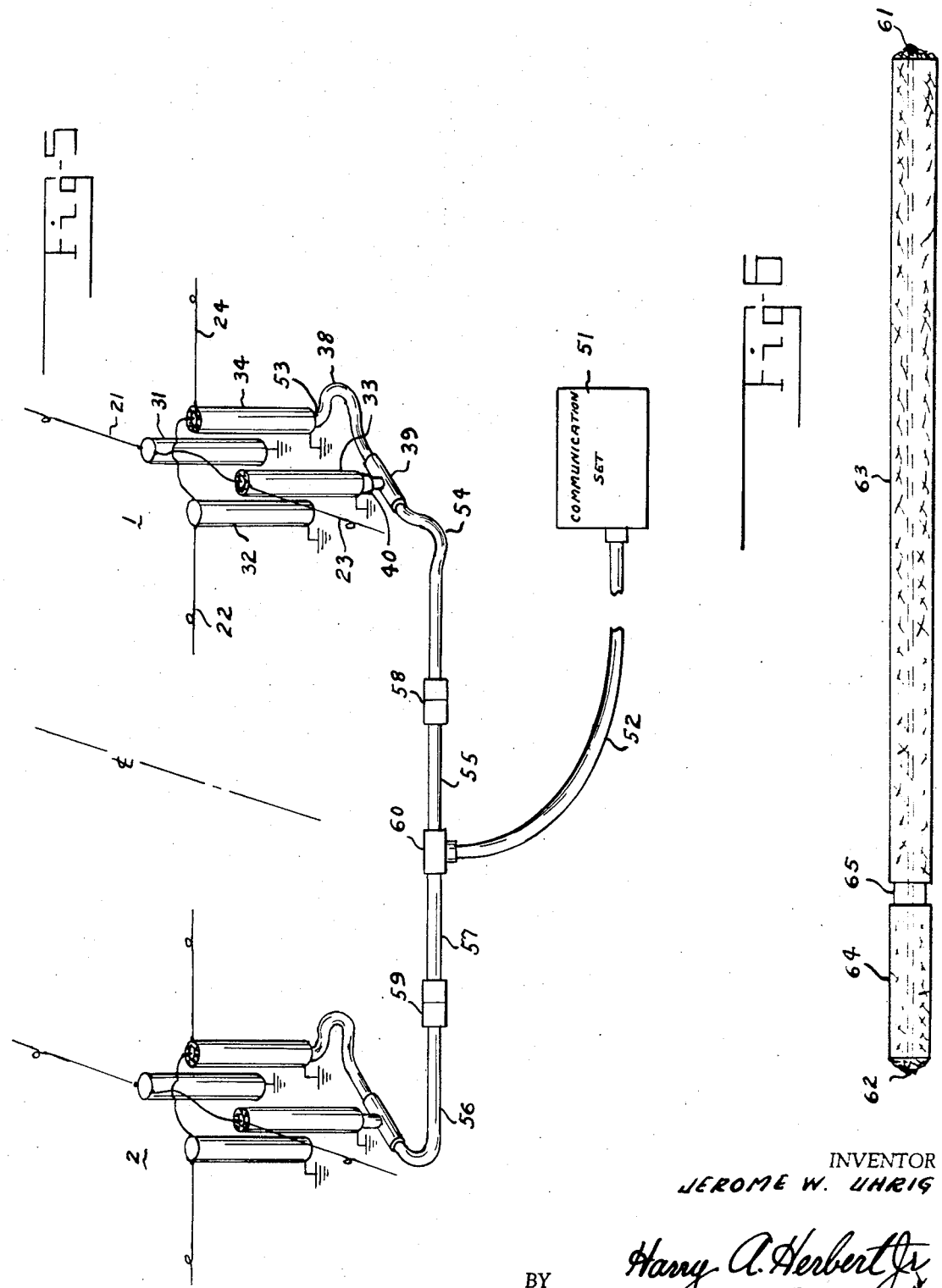

SPACE DIVERSITY ANTENNA SYSTEM FOR UHF SATELLITE COMMUNICATIONS FOR HELICOPTERS

BACKGROUND OF THE INVENTION

The field of the invention is in high frequency antennas for helicopters.

Conventional transmitting and receiving systems employing antennas mounted on top of the fuselage of helicopters suffer over a 12 db loss in signal strength as a rotor blade of the helicopter passes over the antennas. High frequency communication from helicopters to other aircraft and ground stations, particularly those located beyond the horizon, is generally via a satellite link with the direction of propagation being generally through the rotor. Two widely spaced frequencies, such as 303 MHz for transmitting and 249 MHz for receiving, in the UHF band are used. In this band, right circular polarization is also generally employed. This wide separation of frequencies has in the past necessitated either separate transmitting and receiving antennas, a switching means for resonating a single antenna at each frequency, or using a broad band antenna such as the spiral type antenna. The latter type antennas do not provide the frequency selectivity and discrimination against other signals within the band that this invention provides.

SUMMARY OF THE INVENTION

Two in phase, parallel fed, spaced apart approximately one wavelength, circularly polarized antennas mounted on top of the fuselage of a helicopter provide radio communication through the plane of the helicopter rotating blades for communications via satellite. Inductance loading of the radiating elements provides for antenna resonance in the communication band of frequencies at two widely spaced frequencies, one for transmitting and one for receiving. The loss in signal strength in the propagating radio frequency signal due to the helicopter blade shadowing the antenna system is essentially negligible.

BRIEF DESCRIPTION OF THE DRAWING

FIG. 5 is a schematic diagram showing a complete electrical system; and

FIG. 6 is a pictorial view showing a choke element that is inserted in the ends of the tube radiating elements.

DESCRIPTION OF THE PREFERRED EMBODIMENT

Figure 1:
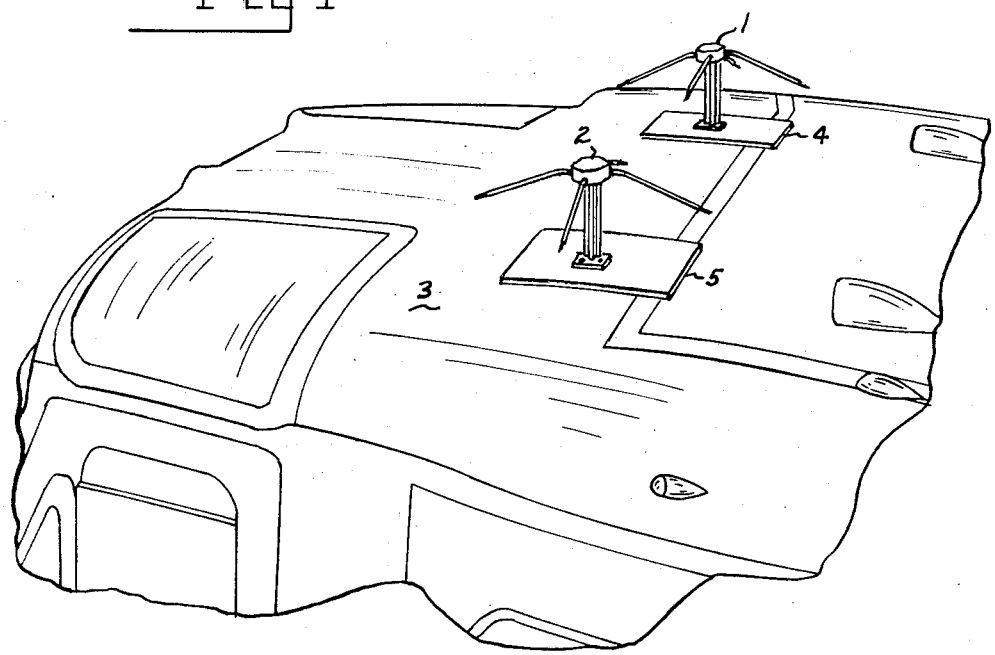
FIG. 1 is a pictorial view showing the typical mounting of the antennas on the top of a helicopter.

Difficulty has been previously encountered in conducting satellite communications with a helicopter because the large whirling blades shadow any antenna mounted on the fuselage as the blades pass over it. This invention comprising two circularly polarized antennas, as shown 1 and 2 in FIG. 1, fed in phase, and spaced approximately one wavelength apart, overcomes this difficulty. This antenna array is mounted on the roof 3 of the cabin with each antenna placed parallel to the other and essentially equidistant from the longitudinal center line of the helicopter. One advantage of this system is that only one of the two antennas is shadowed from communicating with a satellite at any one time. By feeding both antennas in phase (parallel connection) shadowing of one antenna results in not more than a 3 db loss of signal from that obtained with both antennas. (If all the signal to, or from, one antenna were obliterated a 3 db loss would occur.) A single conventional antenna as previously used suffers approximately a measured 12 db loss as a blade passes over it. Additional advantages are the increased signal level obtained by the increased effective capture area of the two antennas, the space diversity effect obtained, and a better overhead beam pattern. Thus, the average overall signal level transmitted to or received from the satellite is greater than with a conventional single antenna. This makes this system much superior to a previous, complicated, essentially unsatisfactory system employing two antennas with a blade timed antenna switch (only one antenna operating at a time) to overcome shadowing. In this disclosed system with both antennas in continuous operation an increased signal gain is obtained all the while neither antenna is shadowed and the drop in signal level as one antenna is shadowed is not objectionable, being barely perceptible to an observant communicator.

Throughout the disclosure of this invention, such terms and expressions as radiator, radiating, capture area, transmission line, and propagation are to be interpreted in their broad sense to include both transmitting and receiving. Also, a specific embodiment of the invention will be set forth in detail with structural dimensions for a particular set of frequencies, i.e., 249 MHz receiving and 303 MHz transmitting, however, dimensions of structural elements will also be given in terms of wavelengths enabling the practicing of this invention at other frequencies and conditions than those specifically enumerated.

The antennas 1 and 2 are essentially identical, each composed of a pair of crossed dipoles. In the specific embodiment both transmit on approximately 303 MHz and receive on 249 MHz. They are spaced approximately one wavelength (39 inches) apart at the higher frequency. Their exact location on top of the fuselage is not critical. Generally they are located forward of the rotor mast and convenient to the internal communication equipment. It is preferable that they be equally distant from the fore and aft center line of the helicopter with the respective radiators parallel to or in line with each other as shown schematically in FIG. 5. The particular orientation of both antennas collectively is not critical. That is, assigning clockface notation to each antenna, it is not critical whether the radiator earliest in phase occupies the 12, 3, 6, or 9 o'clock position as long as the respective radiator in each antenna occupies the same position. The phase relationship shown in the drawing is for right circular polarization as is commonly used in the UHF communication band. To change the polarization to left circular polarization, as is commonly used in the VHF band, it is only necessary to change the 90° delayed element to the reverse direction of rotation from the first driven element (both antennas).

The radiating tube elements 21, 22, 23, and 24 and the impedance balancing tubes 31, 32, 33, and 34 are fabricated from convention antenna conductive materials, typically hard drawn brass or aluminum. (One antenna, the one on the right, will be described in detail, it being understood that the other antenna is essentially identical.) In the specific embodiment, brass tubes having a seven-sixteenths inch outside diameter with a 0.051 wall were used. The impedance balancing tubes 31, 32, 33, and 34 have a total length from the top of the radiating tubes to the bottom of the brass grounding plate 35 of approximately 0.175 wavelength (in air) at the mid-frequency, in the specific embodiment they are approximately 7 ½ inches long for a mid-frequency of 276 MHz. Each of the radiating tubes 21, 22, 23, and 24 are approximately 8 and 5/16 inches long, making a total length from one far end of a tube radiator to the far end of the opposite tube radiator approximately a 0.44 wavelength (in air) for the transmitting frequency of 303 MHz. Each of the radiating tubes have approximately a 20° downward deflection bend 80 at approximately 6 ½ inches from the far end 81 as shown for tube 21 in FIG. 3. This downward angling has been found desirable to broaden the directivity pattern of the radiation beam.

The bottom ends of the balancing tubes are soldered in the ground plate 35 which is attached by the four mounting holes to the airframe or to supporting plates such as shown at 4 and 5 if required structurally. The coaxial cable connections to the antennas protrude through holes in the larger plates to the inside of the cabin for connection with the rest of the system. The top ends of the balancing tubes are soldered to the radiating tubes and the assembly is further supported by the insulating plastic lower and upper supporting members 36 and 37 which are fitted to the tubes and bolted together. Conventional high frequency weather resistant material such as high impact bakelite (phenolic) is suitable insulating material from which to fabricate the supports.

Figure 2:
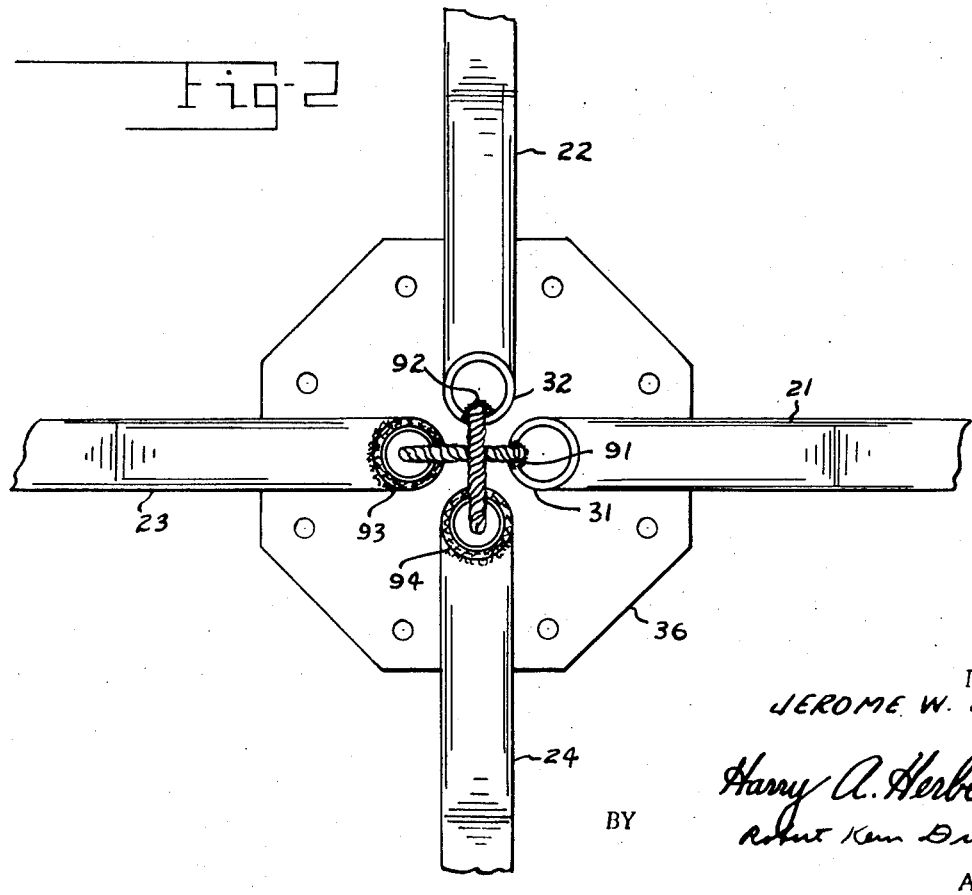
FIG. 2 is a pictorial view showing the electrical connections to the radiating elements of an antenna.

Coaxial cables feeding the radiating elements extend up through the two adjacent impedance matching tubes 33 and 34. The outer braid of the coaxial cable is soldered to the top of the tubes as shown at 93 and 94 in FIG. 2. The center conductor of each cable is soldered to the top of the opposite balancing tube as shown at 91 and 92. The phases of opposite radiators are 180 degrees apart. To provide the orthogonal feed for generating the circular polarization one set of radiators is delayed 90 electrical degrees. This is accomplished by making the coaxial line 38 running from the midpoint of the conventional "T" coupling 39 to the top of the impedance balancing tube, where the tube connects to the radiator and where the braid is soldered, one-half wavelength (electrical) long. The electrical wavelength of the coaxial line going from the "T" connector straight up the tube (through conventional coupler 40) to the top of tube 33 is a quarter wavelength long (electrically), thus there is a quarter wavelength delay in feeding the pair of radiators 22 and 24 over the pair 21–23, and the relative phase relationship of the radiators 21, 22, 23, and 24 is 0°, 90°, 180°, and 270° creating the circularly polarized wave.

To achieve the tuned two-frequency operating characteristic each radiating tube (of both antennas) is choke loaded and its effective length for the lower frequency increased by inserting an especially modified section of coaxial cable. A typical choke loaded insert section is shown in FIG. 6. It is fabricated from a length of conventional coaxial cable such as type RG–87A/U. The total length of the choke loaded insert section is such that the physical overall length of the dipoles are extended to 0.42 wavelength (in air) at the lower frequency. In the specific embodiment being detailed the lower frequency as previously stated is 249 MHz, thus the total physical length of each choke loaded insert section is approximately 8 and 3/16 inches long. The outer insulating jacket is removed from the section of cable and the outer braid is folded over and soldered to the center conductor at each end as shown at 61 and 62. The longer end 63 comprising the choke section of the insert is made a quarter wavelength (electrically) at the higher frequency (which is approximately a length of 6 and 25/32 inches for the 303 MHz). A gap 65 is cut in the braid, severing the braid and exposing the dielectric of the cable for a length of approximately five thirty-seconds of an inch. The length of this gap is not critical. The length is primarily determined by the transmitting power fed into the antenna. It should be long enough to essentially preclude flash over at the highest power used. The choke sections are inserted into the tube radiators until the end of the braid 63 at the cut 65 is almost flush with the end of the tube radiator and then the braid is soldered to the edge of the tube at the end of the radiator as shown at 82 in FIG. 3. Approximately 1/10 inch of braid extending past the end of the tube provides a satisfactory soldering surface. The overall length of a dipole radiator from the end of one choke section to the end of the other choke section is approximately 0.42 wavelength (in air) of the lower frequency, (approximately 20 and 1/16 inches for 249 MHz). In some instances, in order to slide the choke section into the radiator tube it may be necessary that the outer shield braid of double shielded cable be removed. RG–87A/U cable has two shield braids for the outer conductor. Whether it is necessary to remove the outer braid depends upon the particular O.D. over the cable braid and the I.D. of the radiator tube. As long as an outer conductor remains over the choke section it is not critical whether it be a double or single braid. The type coaxial cable used for fabricating the choke is not critical. The normal considerations regarding frequency and power should be taken into account. The electrical length of the cable is critical with regard to the frequencies of operation.

Figure 3:
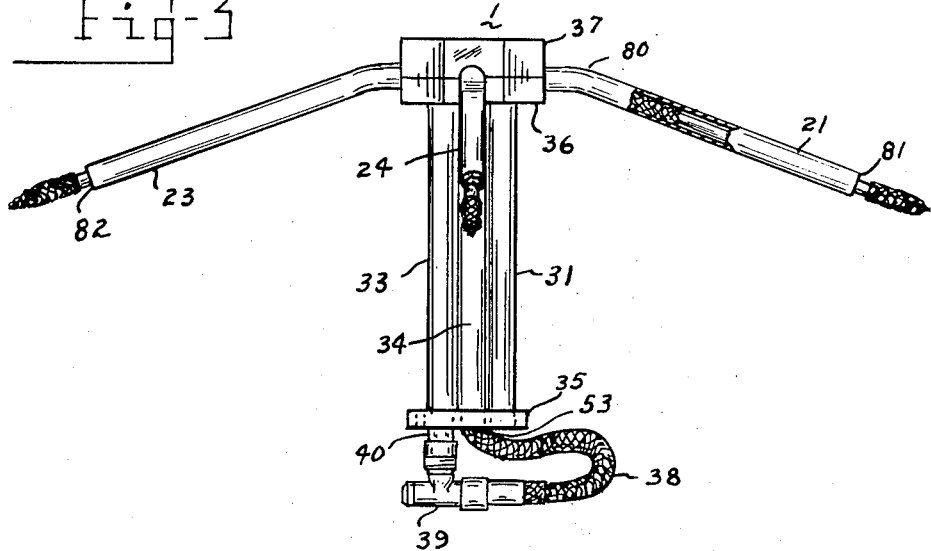
FIG. 3 is a pictorial view of an antenna that mounts on the top of a helicopter fuselage.
Figure 4:
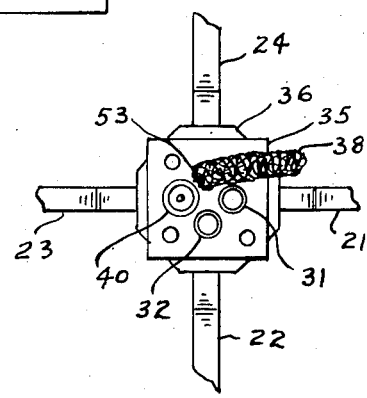
FIG. 4 is a partial pictorial bottom view of the antenna shown in FIG. 3.

FIG. 5 shows an overall pictorial-schematic diagram of the complete antenna system. As is well known, communication sets have a designed coupling impedance which it is desirable to match with the antenna system. A typical impedance that is commonly used is fifty ohms, and that is the value used in the embodiment being detailed. (Those skilled in the art will readily adapt the invention to other impedances as well as other frequencies.) Thus, communication set 51 (FIG. 5) has an antenna coupling impedance of 50 ohms. RG–87A/U cable is fifty ohm impedance cable and is therefore suitable for cable 52. (Other coaxial cable may be used taking into the consideration of the impedance of the communication set, the power to be put through the cable, and the frequencies of operation.) Type RG–87A/U coaxial cable (with the outer insulating jacket removed is also suitable for the section of coaxial cable 38 extending into the impedance balancing tube 34 and the section of cable running up impedance balancing tube 33. The braid outer conductors of both of these cables are also soldered to the respective impedance balancing tubes at the ground end of the tubes. For tube 33 this is done at the cable connector 40 where the connector and braid are soldered together and to the ground base plate 35. Where the cable 38 emerges from the tube 34, the braid of the cable is soldered to the ground plate as shown at 53. (This is also shown in FIGS. 3 and 4.)

The antennas, spaced a wavelength apart, are fed in phase-parallel and each antenna consists of a pair of crossed dipoles. The four dipoles are impedance matched to the 50 ohm line 52 connecting with the communication set by two essentially identical sets of coaxial matching network sections. The matching section for antenna 1 comprises the one-quarter wavelength (electrical) of fifty ohm coaxial cable 54 and the one-half wavelength (electrical) of ninety-three ohm cable 55. Type RG–87A/U is suitable 50 ohm cable and type RG–210/U is suitable ninety-three ohm cable. The electrical lengths of the cables are based on the mid-frequency of operation, in the specific embodiment 276 MHz, and the physical lengths calculated therefrom. The matching network for antenna 2 is comprised of similar cables 56 and 57. Conventional coaxial connectors 58, 59, and 60 are used to connect the matching sections together and to the feed line. The matching sections also provide the physical lengths of cable required to position the antennas a wavelength apart.

Measurements on typical operating embodiments of the invention show equal VSWR (voltage-standing-wave-ratio) at both frequencies (249 MHz and 303 MHz) of 1.46.

I claim:

1. An helicopter antenna system for two frequencies of electromagnetic radiation propagating through the plane of the helicopter blades, the said antenna system cooperating with a communication set having a determined impedance, and comprising:
   1. a first and a second antenna each having two crossed tubular dipoles of two radiating elements and each tubular dipole having a length of approximately 0.44 wavelength of the higher of the said two frequencies;
   2. a choke element inserted in each of the said radiating elements for extending the length of each dipole at the lower frequency to approximately 0.42 wavelength of the lower of the said two frequencies;
   3. means for positioning the said two antennas on top of the cabin of the helicopter approximately one wavelength apart at the higher of the two frequencies;
   4. means for orthogonally feeding the radiating elements of each of the antennas for circularly polarized electromagnetic radiation; and
   5. an impedance matching network coupling the antennas in phase-parallel relationship and providing the said determined impedance of the communication set.

2. The antenna system as claimed in claim 1 wherein the said choke elements are sections of coaxial cable having the center conductor connected to the shield braid at each end and with a gap in the braid at an electrical length from one end of the cable of approximately one-quarter wavelength at the higher of the two said frequencies, and the said choke elements are inserted in the said tubular radiating elements to position the gap in the braid of each choke element approximately at the end of the respective said tubular radiator.

3. The antenna system as claimed in claim 2 wherein the said means for orthogonally feeding the radiating elements includes parallel impedance balancing tubes having a length of approximately 0.175 wavelength at the mid-frequency of the said two frequencies each connected at one end to a radiating element at the center of each dipole and grounded at the other end and the said means also includes means for delaying the feed to one dipole of each antenna approximately one-quarter wavelength.

* * * * *